(12) United States Patent
Ahn et al.

(10) Patent No.: US 11,916,269 B2
(45) Date of Patent: Feb. 27, 2024

(54) CHARGING SYSTEM INCLUDING FUEL CELL AND CHARGING METHOD USING THE SAME

(71) Applicants: Hyundai Motor Company, Seoul (KR); Kia Corporation, Seoul (KR)

(72) Inventors: Deuk Keun Ahn, Whasung-Si (KR); Jae Min Son, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 219 days.

(21) Appl. No.: 17/532,786

(22) Filed: Nov. 22, 2021

(65) Prior Publication Data

US 2022/0293983 A1  Sep. 15, 2022

(30) Foreign Application Priority Data

Mar. 9, 2021  (KR) .................. 10-2021-0030994

(51) Int. Cl.
*H01M 8/04858* (2016.01)
*B60R 16/033* (2006.01)
(Continued)

(52) U.S. Cl.
CPC ....... *H01M 8/04947* (2013.01); *B60R 16/033* (2013.01); *H01M 8/04201* (2013.01);
(Continued)

(58) Field of Classification Search
CPC ......... H01M 8/04947; H01M 8/04201; H01M 8/04559; H01M 8/0494; H01M 16/006; H01M 2220/10; H01M 2250/10; H01M 8/04298; H01M 8/04089; H01M 8/04552; H01M 8/0488; H01M 8/04932; H01M 8/04992; H01M 8/249; H01M 2250/20; B60R 16/033; Y02T 90/40; H02J 7/007; H02J 7/0071; B60L 58/30; B60L 53/665; B60Y 2306/05; Y02E 60/50
(Continued)

(56) References Cited

U.S. PATENT DOCUMENTS

| | | | | |
|---|---|---|---|---|
| 5,991,670 A | * | 11/1999 | Mufford | B60L 58/30 |
| | | | | 429/513 |
| 2010/0209795 A1 | * | 8/2010 | Hardwicke | H01M 8/04 |
| | | | | 429/432 |
| 2012/0326668 A1 | * | 6/2012 | Ballantine | H02J 7/00 |
| | | | | 320/109 |

FOREIGN PATENT DOCUMENTS

DE  102017007213 A1 * 1/2019
KR  10-2016-0072975 A   6/2016

* cited by examiner

*Primary Examiner* — Hal Kaplan
*Assistant Examiner* — Swarna N Chowdhuri
(74) *Attorney, Agent, or Firm* — MORGAN, LEWIS & BOCKIUS LLP

(57) ABSTRACT

A charging system may include a plurality of fuel cell stacks configured to receive hydrogen from a hydrogen supply unit and generate power, a plurality of charging dispensers configured to be electrically connected to a load device and configured to provide power upon connected to the load device, and a controller configured to distribute and supply the power generated by the plurality of fuel cell stacks to a charging dispenser to which the load device is connected, to compare a total available power amount of the plurality of fuel cell stacks with a total power demand amount of the charging dispenser to which the load device is connected, and to control a power generation amount of each of the plurality of fuel cell stacks according to a result of the comparing.

17 Claims, 2 Drawing Sheets

(51) Int. Cl.
*H01M 8/04082* (2016.01)
*H01M 8/04537* (2016.01)
*H01M 16/00* (2006.01)

(52) U.S. Cl.
CPC ..... *H01M 8/04559* (2013.01); *H01M 8/0494* (2013.01); *H01M 16/006* (2013.01); *H01M 2220/10* (2013.01); *H01M 2250/10* (2013.01)

(58) Field of Classification Search
USPC ....................................................... 307/9.1
See application file for complete search history.

CHARGING SYSTEM INCLUDING FUEL CELL AND CHARGING METHOD USING THE SAME

CROSS-REFERENCE TO RELATED APPLICATION

The present application claims priority to Korean Patent Application No. 10-2021-0030994, filed Mar. 9, 2021 in the Korean Intellectual Property Office, the entire contents of which is incorporated herein for all purposes by this reference.

BACKGROUND OF THE INVENTION

Field of the Invention

The present invention relates to a method of controlling output of a fuel cell system depending on the number of electric mobility devices as a charging target in an electric mobility device charging system including a plurality of fuel cell systems, and more particularly to a charging system including a fuel cell and a charging method using the same for ensuring the durability and performance of the stack and simultaneously reducing unnecessary maintenance costs in the electric mobility device charging system including the fuel cell stack by controlling output and limiting output.

Description of Related Art

A fuel cell is an energy conversion device for converting chemical energy of hydrogen into electrical energy through an electrochemical reaction between hydrogen and oxygen in a stack, and applications of an engine and a generator of an electric mobility device have expanded. Furthermore, as concerns about air pollution have gradually increased, demand for eco-friendly vehicles such as electric vehicles and hydrogen fuel cell vehicles has rapidly increased, and such eco-friendly vehicles have attracted attention in various countries around the world to respond to various environmental regulations.

The present invention relates to control of a portable generation system (PGS). An electric mobility device charging system using a fuel cell is a field that has not yet been developed, and thus needs to be urgently developed. Furthermore, in the case of a fuel cell, it is very difficult to maintain chemical durability as well as charging capability of the fuel cell, and there is no control method for improving the durability of the fuel cell while demand for charging is satisfied, and accordingly, the control method needs to be developed.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method of controlling output of a fuel cell system depending on the number of electric mobility devices as a charging target in an electric mobility device charging system including a plurality of fuel cell systems, more particularly, a charging system including a fuel cell and a charging method using the same for ensuring the durability and performance of the stack and simultaneously reducing unnecessary maintenance costs in the electric mobility device charging system including the fuel cell stack by controlling and limiting output.

In accordance with an aspect of the present invention, there is provided a charging system including a fuel cell, including a plurality of fuel cell stacks configured to receive hydrogen from a hydrogen supply unit and generate power, a plurality of charging dispensers configured to be electrically connected to a load device and configured to provide power upon connected to the load device, and a controller configured to distribute and supply the power generated by the plurality of fuel cell stacks to a charging dispenser to which the load device is connected, to compare a total available power amount of the plurality of fuel cell stacks with a total power demand amount of the charging dispenser to which the load device is connected, and to control a power generation amount of each of the plurality of fuel cell stacks according to a result of the comparing.

A fuel cell stack may include an air supply unit, a cooling unit, and a battery, and upon receiving hydrogen from a hydrogen supply unit, the fuel cell stack may autonomously generate power.

The charging system may be integrally assembled with a fuel cell stack, the charging dispenser, and the controller and is moveable.

The load device may include an electric mobility device.

The controller may be configured to determine the total power demand amount by summing a power demand amount of the charging dispenser to which the load device is connected among the plurality of charging dispensers.

The controller may be configured to determine the total available power amount of the fuel cell stacks by summing available power amount of all of the fuel cell stacks.

When the total available power amount is equal to the total power demand amount, the controller may be configured to control the fuel cell stacks to generate a same power.

When the total available power amount is greater than the total power demand amount, the controller may be configured to control the fuel cell stacks to distribute and generate the total power demand.

When the total available power amount is less than the total power demand amount, the controller may be configured to control the fuel cell stacks to generate a maximum power.

When a number of load devices connected to the charging dispenser is changed or the power demand amount is changed, the controller may re-compare the total available power amount of the plurality of fuel cell stacks with the total power demand amount of the charging dispenser to which the load device is connected and may correct and control the power generation amount of each of the plurality of fuel cell stacks.

The controller may monitor output voltage of each of the plurality of fuel cell stacks, and when the output voltage is equal to or less than a reference voltage, the controller may be configured to control a fuel cell stack having the output voltage equal to or less than the reference voltage among the plurality of fuel cell stacks, to limit output of the fuel cell stack having the output voltage equal to or less than the reference voltage, by a predetermined amount.

When the output of the fuel cell stack is limited, the controller may re-compare the total available power amount of the plurality of fuel cell stacks with the total power demand amount of the charging dispenser to which the load device is connected and may correct and control the power generation amount of each of the plurality of fuel cell stacks.

In accordance with another aspect of the present invention, there is provided a charging method using the charging system including the fuel cell, including recognizing a charging dispenser to which a load device is connected among a plurality of charging dispensers, by a controller, comparing a total available power amount of a plurality of fuel cell stacks with a total power demand amount of a charging dispenser to which a load device is connected, by the controller, and controlling a power generation amount of each fuel cell according to a comparison result between the total available power amount and the total power demand amount, by the controller.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
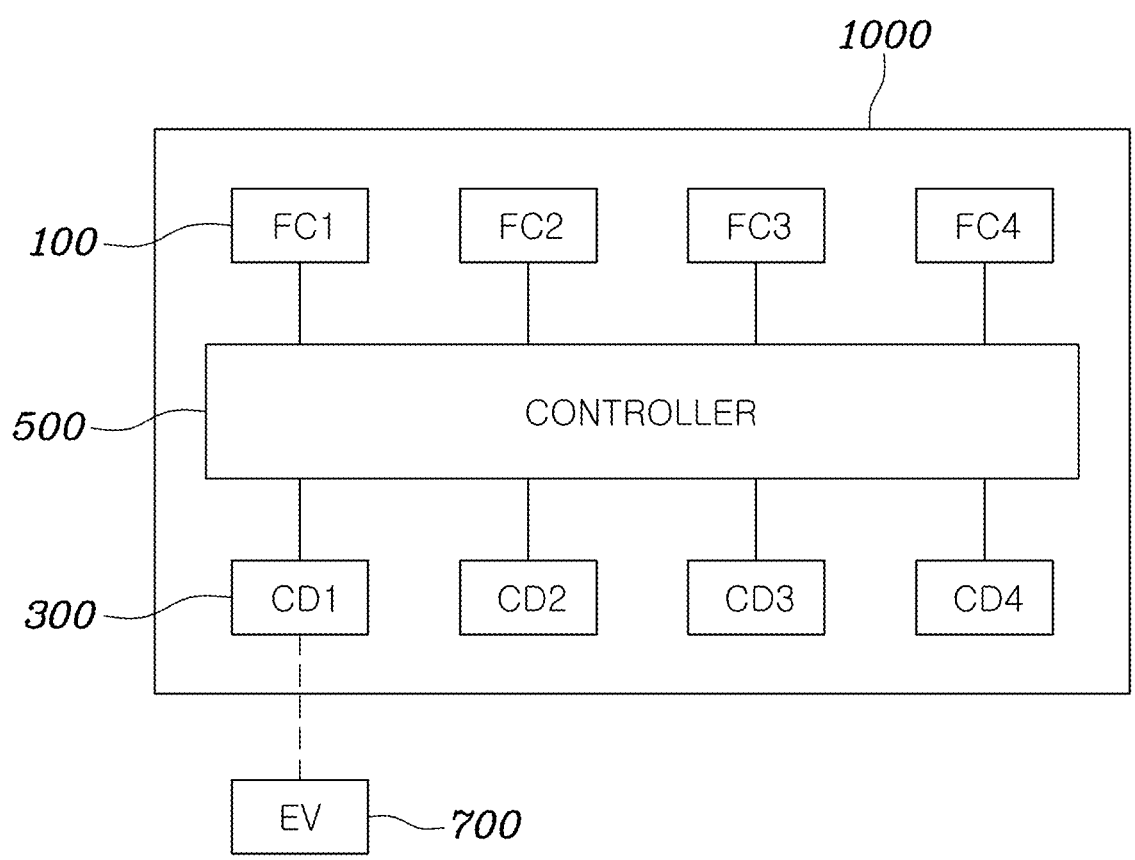
FIG. 1 is a diagram showing the configuration of a charging system including a fuel cell according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Figure 2:
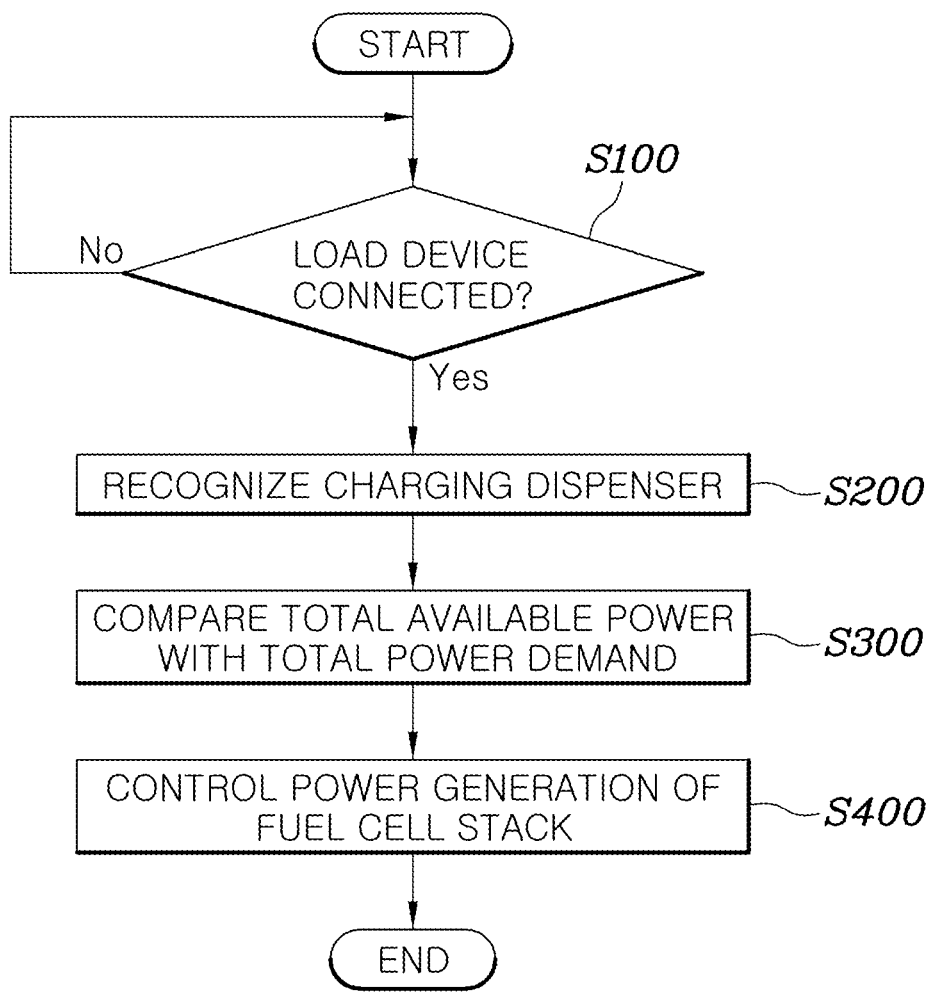
FIG. 2 is a flowchart of a charging method using a charging system including a fuel cell according to various exemplary embodiments of the present invention.

FIG. 1 is a diagram showing the configuration of a charging system including a fuel cell according to various exemplary embodiments of the present invention. FIG. 2 is a flowchart of a charging method using a charging system including a fuel cell according to various exemplary embodiments of the present invention.

FIG. 1 is a diagram showing the configuration of a charging system including a fuel cell according to various exemplary embodiments of the present invention. A charging system 1000 including a fuel cell according to various exemplary embodiments of the present invention may include a plurality of fuel cell stacks 100 for receiving hydrogen from a hydrogen supply unit and generating power, a plurality of charging dispensers 300 electrically connected to a load device 700 and providing power when connected to the load device 700, and a controller 500 for distributing and supplying the supplied power generated by the plurality of fuel cell stacks 100 to the charging dispenser 300 to which the load device is connected, comparing a total available power amount of the plurality of fuel cell stacks 100 with a total power demand amount of the charging dispenser to which the load device 700 is connected, and controlling a power generation amount of each of the plurality of fuel cell stacks 100.

In a case in which an electric mobility device such as an electric vehicle using a charging system including a fuel cell is charged, a controller may perform power generation of a fuel cell stack, a mobility device may be connected to a charging dispenser, and the controller may execute logic of charging the generated power of the fuel cell stack in the mobility device.

The charging system may include a plurality of fuel cell stacks and may also include a plurality of charging dispensers, and accordingly, it may be possible to simultaneously charge a plurality of mobility devices.

Thus, detailed power generation strategies of fuel cell stacks may be necessary in various cases. When only one mobility device is charged, any one of the fuel cell stacks may take charge of power generation, but to maintain uniform durability of the fuel cell stacks, the plurality of fuel cell stacks may simultaneously perform power generation, and may sum the generated power and may provide the same to a mobility device.

FIG. 1 is a diagram showing the configuration of a charging system including a fuel cell according to various exemplary embodiments of the present invention. In detail, the charging system may include the plurality of fuel cell stacks 100, and each of the plurality of fuel cell stacks 100 may receive hydrogen from the hydrogen supply unit and may generate power. The hydrogen supply unit may be provided as infrastructure outside the charging system or may be configured in a form of a small tank inside the charging system.

The fuel cell stacks 100 may include an air supply unit, a cooling unit, and a battery, and upon receiving hydrogen from the hydrogen supply unit, the fuel cell stacks 100 may autonomously generate power. That is, for power generation of the fuel cell, hydrogen and air or oxygen needs to be supplied, and auxiliary machinery for supplying air is necessary and may be provided inside the fuel cell stacks 100. The cooling unit of cooling and a high-voltage battery may also be included in the fuel cell stacks 100, and the fuel cell stack may autonomously generate power.

The charging system 1000 may be integrally assembled with the fuel cell stacks 100, the charging dispensers 300, and the controller 500 and may be moveable. That is, the fuel cell stacks 100, the charging dispensers 300, and the controller 500 may be assembled in a form of a module, and may include a container or a driver provided therein to enable mobile power generation as a charging mobility device. While moving, the charging system 1000 may advantageously be autonomously driven by power generated by the fuel cell stack or power charged in a high-voltage battery.

In the instant case, irrespective of the location, it may be possible to rapidly charge a mobility device at various points.

The load device 700 may be electrically connected to each of the plurality of charging dispensers 300 and may function as a connector for supplying power in the case of connection of the load device 700.

The controller 500 may distribute and provide supplied power generated by the plurality of fuel cell stacks 100 to the charging dispensers 300 to which the load device is connected, and the total available power amount of the plurality of fuel cell stacks 100 may be compared with the total power demand amount of the charging dispensers 300 to which the load device is connected to control the power generation amount of each of the plurality of fuel cell stacks 100.

The load device 700 to which various exemplary embodiments of the present invention is applied may include an electric mobility device.

The controller 500 may be provided between the fuel cell stacks 100 and the charging dispensers 300 to recognize a charging request of the load device connected to the charging dispensers 300, may control an operation of the fuel cell stacks 100, and may synthetically perform a function of power distribution of distributing generated power to each of the charging dispensers 300.

The controller according to various exemplary embodiments of the present invention may be embodied through a non-volatile memory configured to store data of an algorithm configured to control operations of various components or a software command for reproducing the algorithm, and a processor configured to perform an operation to be described below using the data stored in the corresponding memory. Here, the memory and the processor may be embodied as a separate chip. Alternatively, the memory and the processor may be embodied as a single integrated chip and the processor may be embodied in a form of one or more processors.

The controller 500 may distribute and provide supplied power generated by the plurality of fuel cell stacks 100 to the charging dispensers 300 to which the load device is connected, and may compare the total available power amount of the plurality of fuel cell stacks 100 with the total power demand amount of the charging dispensers 300 to which the load device 700 is connected to control the power generation of each of the plurality of fuel cell stacks 100.

The number of the fuel cell stacks 100 is fixed, but in the case of the load device 700, the number of the load devices 700 that are charged in real time may be changed. Thus, the controller 500 may compare the total available power amount of the plurality of fuel cell stacks 100 with the total power demand amount of the charging dispensers 300 to which the load device 700 is connected to control the power generation amount of each of the plurality of fuel cell stacks 100. Accordingly, the durability of the fuel cell stacks 100 may be maintained for a long time by stably driving all of the plurality of fuel cell stacks 100 while power demand amount is always satisfied.

The controller 500 may determine the total power demand amount by summing power demand amount of the charging dispensers 300 to which the load device is connected among all of the charging dispensers 300. That is, all of the charging dispensers 300 may not be always connected to the load device, and the number and type of the load devices 700 that are connected to the charging dispensers 300 every minute may be changed. Accordingly, the controller 500 may monitor change in power demand amount of the load device 700 and may respond thereto in real time.

In contrast, the controller 500 may determine the total available power amount of the fuel cell stacks 100 by summing available power amount of all of the fuel cell stacks 100. In the case of the fuel cell stacks 100, the number of the fuel cell stacks 100 is fixed, and thus, in the case of the total available power, the total available power amount may be determined by summing the available power amount of all of the fuel cell stacks 100 irrespective of connection of the load device 700.

The controller 500 may control each of the plurality of fuel cell stacks 100 to generate the same power when the total available power amount is equal to the total power demand. When the total available power amount is greater than the total power demand amount, the controller 500 may control each of the plurality of fuel cell stacks 100 to distribute and generate the total power demand. When the total available power amount is smaller than the total power demand amount, the controller 500 may control each of the plurality of fuel cell stacks 100 to generate the maximum power.

That is, the controller 500 may compare the total available power amount of the plurality of fuel cell stacks 100 with the total power demand amount of the charging dispensers 300 to which the load device 700 is connected to control the power generation amount of each of the plurality of fuel cell stacks 100, and to the present end, may compare the total available power amount and the total power demand amount in real time.

Thus, when the two power amounts are equal to each other, each of the plurality of fuel cell stacks 100 may perform power generation to equalize the maximum power amount, and accordingly, the durability of the plurality of fuel cell stacks 100 may be maintained.

When demand exceeds supply, each of the plurality of fuel cell stacks 100 may also perform power generation to equalize the maximum power amount, and accordingly, the durability of the plurality of fuel cell stacks 100 may be maintained.

When supply exceeds demand, each of the plurality of fuel cell stacks 100 may partially generate the total power demand amount, and accordingly, the durability of the plurality of fuel cell stacks 100 may also be maintained.

That is, in any case, the fuel cell stacks 100 may maintain durability at similar levels by generating the same power amount, and a degree of deterioration of all of the fuel cell stacks 100 may be reduced as much as possible.

When the number of the load devices 700 connected to the charging dispensers 300 is changed or the power demand amount is changed, the controller 500 may re-compare the total available power amount of the plurality of fuel cell stacks 100 with the total power demand amount of the charging dispensers 300 to which the load device 700 is connected to correct and change the power generation amount of each of the plurality of fuel cell stacks 100 according to a result of the re-comparing.

The controller 500 may monitor output voltage of each of the plurality of fuel cell stacks 100 and may control a fuel cell stack having an output voltage equal to or less than a reference voltage to output limited power. In the instant case, when output of the fuel cell stack is limited, the controller 500 may re-compare the total available power amount of the plurality of fuel cell stacks with the total power demand amount of the charging dispensers 300 to which the load device is connected to correct and control the power generation amount of each of the plurality of fuel cell stacks according to a result of the re-comparing.

When output voltage of any one fuel cell stack is lower than the reference voltage, a corresponding fuel cell stack may be determined to be seriously degraded, output of the corresponding fuel cell stack may be limited by a predetermined amount, and other normal fuel cell stacks may take charge of the limited power generation amount, preventing the fuel cell stack from being rapidly degraded.

To the present end, when output of the fuel cell stack is limited, the controller 500 may re-compare the total available power amount of the plurality of fuel cell stacks with the total power demand amount of the charging dispensers 300 to which the load device is connected to correct and control the power generation amount of each of the plurality of fuel cell stacks.

That is, the controller 500 may monitor output voltage of each of the plurality of fuel cell stacks 100 in real time and may diagnose a state of each stack. When a voltage of a specific stack of various stacks is lowered to a voltage of a V (e.g., 290 V) or less, output of the corresponding stack may be limited and be maintained to a kW (e.g., 70 kw), and when the voltage of the specific stack is lowered to a measured voltage b V (e.g., 270 V) or less, output of the corresponding stack may be limited to be driven only at b kW (e.g., 60 kW) or less.

As described above, when output is distributed, each fuel cell system may minimize an OCV exposure time while a mobility device is charged, ensuring the durability of an electrolyte membrane. The states of a plurality of stacks may be diagnosed by monitoring a plurality of stack voltages in real time, and output of each stack may be limited depending on the state thereof, ensuring the driving stability of the plurality of fuel cell stacks.

FIG. 2 is a flowchart of a charging method using a charging system including a fuel cell according to various exemplary embodiments of the present invention. The charging method using a charging system including a fuel cell according to various exemplary embodiments of the present invention may include recognizing a charging dispenser to which a load device is connected among a plurality of charging dispensers, by a controller (S100 and S200), comparing a total available power amount of a plurality of fuel cell stacks with a total power demand amount of a charging dispenser to which a load device is connected, by the controller (S300), and controlling a power generation amount of each fuel cell stack according to the comparison result between the total available power amount and the total power demand amount, by the controller (S400).

In the charging method using a charging system including a fuel cell according to various exemplary embodiments of the present invention, the controller may first recognize a charging dispenser to which a load device is connected among a plurality of charging dispensers and may compare the total available power amount of the plurality of fuel cell stacks with the total power demand amount of the charging dispenser to which the load device is connected. The controller may be configured to control the power generation amount of each fuel cell stack according to the comparison result between the total available power amount and the total power demand.

The present invention relates to a method of controlling output of a fuel cell system depending on the number of electric mobility devices as a charging target in an electric mobility device charging system including a plurality of fuel cell systems to ensure the durability of a fuel cell stack included in the corresponding system.

A fuel cell system for charging an electric mobility device has not been developed yet, and thus it may be very effective to apply the technology according to various exemplary embodiments of the present invention, and a charging system including a plurality of fuel cell systems and configured to charge a plurality of electric mobility devices may ensure the durability of the fuel cell stack using a method of limiting output of each fuel cell system through a method of limiting output and diagnosing a stack state in real time for avoiding an OCV state to ensure the durability of the fuel cell stack.

When deterioration of an electrolyte membrane of a fuel cell accelerates, there are concerns about degradation in performance and durability, and in the worst case, due to irreversible damage to the electrolyte membrane, costs for stack replacement may be incurred. Thus, according to various exemplary embodiments of the present invention, the electric mobility device charging system including a fuel cell stack may ensure the durability and performance of the stack and may simultaneously reduce unnecessary maintenance costs by selectively controlling output of the fuel cell stack and limiting output thereof.

The charging system including a fuel cell and a charging method using the same according to various exemplary embodiments of the present invention relates to a method of controlling output of a fuel cell system depending on the number of electric mobility devices as a charging target in an electric mobility device charging system including a plurality of fuel cell systems, and may ensure the durability and performance of the stack in the electric mobility device charging system including the fuel cell stack and may simultaneously reduce unnecessary maintenance costs by controlling and limiting output thereof.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A charging system including a fuel cell, the charging system comprising:
    a plurality of fuel cell stacks receiving hydrogen from a hydrogen supply unit to generate power;
    a plurality of charging dispensers configured to be electrically connected to a load device and configured to provide power to the load device; and
    a controller configured to distribute and supply the power generated by the plurality of fuel cell stacks to a charging dispenser to which the load device is connected among the plurality of charging dispensers, to compare a total available power amount of the plurality of fuel cell stacks with a total power demand amount of the charging dispenser to which the load device is connected, and to control a power generation amount of each of the plurality of fuel cell stacks according to a result of the comparing,
    wherein, when a number of load devices connected to the charging dispenser is changed, the controller is configured to re-compare the total available power amount of the plurality of fuel cell stacks with the total power demand amount of the charging dispenser to which the load device is connected and to correct and control the power generation amount of each of the plurality of fuel cell stacks according to a result of the re-comparing.

2. The charging system of claim 1, wherein each of the plurality of fuel cell stacks includes an air supply unit, a cooling unit, and a battery, and upon receiving the hydrogen from the hydrogen supply unit, each of the plurality of fuel cell stacks autonomously generates power.

3. The charging system of claim 1, wherein the charging system is integrally assembled with the plurality of fuel cell stacks, the plurality of charging dispensers and the controller, and is moveable.

4. The charging system of claim 1, wherein the load device includes an electric mobility device.

5. The charging system of claim 1, wherein the controller is configured to determine the total power demand amount by summing a power demand amount of the charging dispenser to which the load device is connected among the plurality of charging dispensers.

6. The charging system of claim 1, wherein the controller is configured to determine the total available power amount of the fuel cell stacks by summing available power amount of all of the fuel cell stacks.

7. The charging system of claim 1, wherein, when the total available power amount is equal to the total power demand amount, the controller is configured to control the fuel cell stacks to generate a same power.

8. The charging system of claim 7, wherein, when the total available power amount is equal to the total power demand amount, the controller is configured to control the fuel cell stacks to generate a same maximum power amount.

9. The charging system of claim 1, wherein, when the total available power amount is greater than the total power demand amount, the controller is configured to control the fuel cell stacks to distribute and generate the total power demand amount.

10. The charging system of claim 1, wherein, when the total available power amount is less than the total power demand amount, the controller is configured to control the fuel cell stacks to generate a maximum power amount.

11. A charging system including a fuel cell, the charging system comprising:
    a plurality of fuel cell stacks receiving hydrogen from a hydrogen supply unit to generate power;
    a plurality of charging dispensers configured to be electrically connected to a load device and configured to provide power to the load device; and
    a controller configured to distribute and supply the power generated by the plurality of fuel cell stacks to a charging dispenser to which the load device is connected among the plurality of charging dispensers, to compare a total available power amount of the plurality of fuel cell stacks with a total power demand amount of the charging dispenser to which the load device is connected, and to control a power generation amount of each of the plurality of fuel cell stacks according to a result of the comparing,
    wherein, when the power demand amount is changed, the controller is configured to re-compare the total available power amount of the plurality of fuel cell stacks with the total power demand amount of the charging dispenser to which the load device is connected and to correct and control the power generation amount of each of the plurality of fuel cell stacks according to a result of the re-comparing.

12. A charging system including a fuel cell, the charging system comprising:
    a plurality of fuel cell stacks receiving hydrogen from a hydrogen supply unit to generate power;
    a plurality of charging dispensers configured to be electrically connected to a load device and configured to provide power to the load device; and
    a controller configured to distribute and supply the power generated by the plurality of fuel cell stacks to a charging dispenser to which the load device is connected among the plurality of charging dispensers, to compare a total available power amount of the plurality of fuel cell stacks with a total power demand amount of the charging dispenser to which the load device is connected, and to control a power generation amount of each of the plurality of fuel cell stacks according to a result of the comparing, wherein the controller is configured to monitor output voltage of each of the plurality of fuel cell stacks, and when the output voltage is equal to or less than a reference voltage, the controller is configured to control a fuel cell stack having the output voltage equal to or less than the reference voltage among the plurality of fuel cell stacks, to limit output of the fuel cell stack having the output voltage equal to or less than the reference voltage, by a predetermined amount, and wherein, when the output of the fuel cell stack is limited by the predetermined amount, the controller is configured to re-compare the total available power amount of the plurality of fuel cell stacks with the total power demand amount of the charging dispenser to which the load device is connected and to correct and control the power generation amount of each of the plurality of fuel cell stacks according to a result of the re-comparing.

13. A charging method using a charging system including a fuel cell, the method comprising:
   determining, by a controller, a charging dispenser to which a load device is connected among a plurality of charging dispensers;
   comparing, by the controller, a total available power amount of the plurality of fuel cell stacks with a total power demand amount of the charging dispenser to which the load device is connected; and
   controlling, by the controller, a power generation amount of each fuel cell according to a result of comparing between the total available power amount and the total power demand,
   wherein the charging system includes:
      the fuel cell;
      the plurality of fuel cell stacks receiving hydrogen from a hydrogen supply unit to generate power;
      the plurality of charging dispensers configured to be electrically connected to the load device and configured to provide power to the load device; and
      the controller configured to distribute and supply the power generated by the plurality of fuel cell stacks to the charging dispenser to which the load device is connected among the plurality of charging dispensers.

14. The charging method of claim 13, further including:
   when the total available power amount is equal to the total power demand amount, controlling, by the controller, the fuel cell stacks to generate a same power;
   when the total available power amount is greater than the total power demand amount, controlling, by the controller, the fuel cell stacks to distribute and generate the total power demand, and
   when the total available power amount is less than the total power demand amount, controlling, by the controller, the fuel cell stacks to generate a maximum power amount.

15. The charging method of claim 13, further including:
   when a number of load devices connected to the charging dispenser is changed or a power demand amount of the charging dispenser to which the load device is connected among the plurality of charging dispensers is changed, re-comparing, by the controller, the total available power amount of the plurality of fuel cell stacks with the total power demand amount of the charging dispenser to which the load device is connected and correcting and controlling, by the controller, the power generation amount of each of the plurality of fuel cell stacks according to a result of the re-comparing.

16. The charging method of claim 13, further including:
   monitoring, by the controller, output voltage of each of the plurality of fuel cell stacks; and
   when the output voltage is equal to or less than a reference voltage, controlling, by the controller, a fuel cell stack having the output voltage equal to or less than the reference voltage among the plurality of fuel cell stacks, to limit output of the fuel cell stack having the output voltage equal to or less than the reference voltage, by a predetermined amount.

17. The charging method of claim 16, wherein, when the output of the fuel cell stack is limited by the predetermined amount, re-comparing, by the controller, the total available power amount of the plurality of fuel cell stacks with the total power demand amount of the charging dispenser to which the load device is connected and correcting and controlling, by the controller, the power generation amount of each of the plurality of fuel cell stacks according to a result of the re-comparing.

* * * * *